United States Patent Office 3,349,563
Patented Oct. 31, 1967

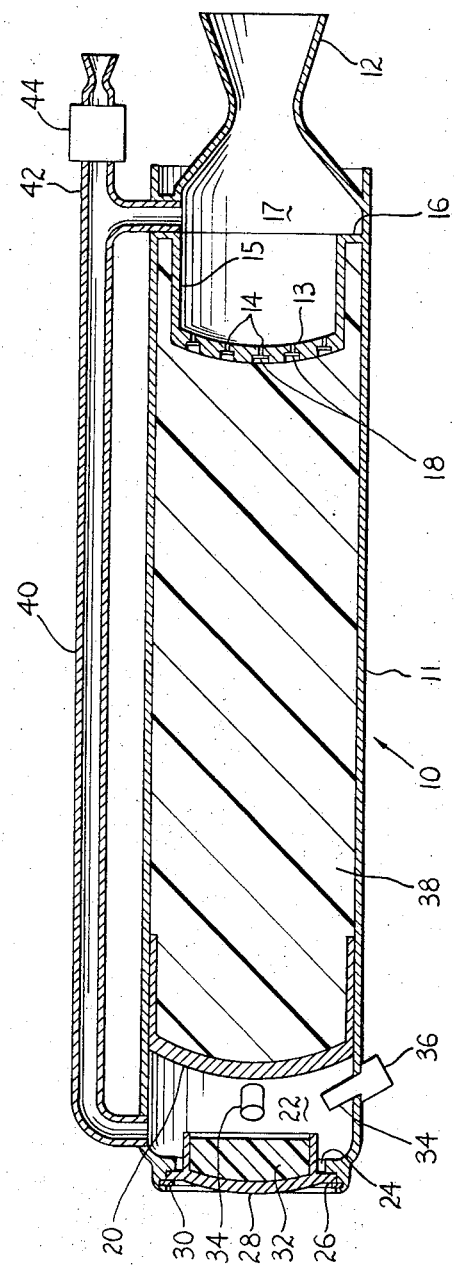

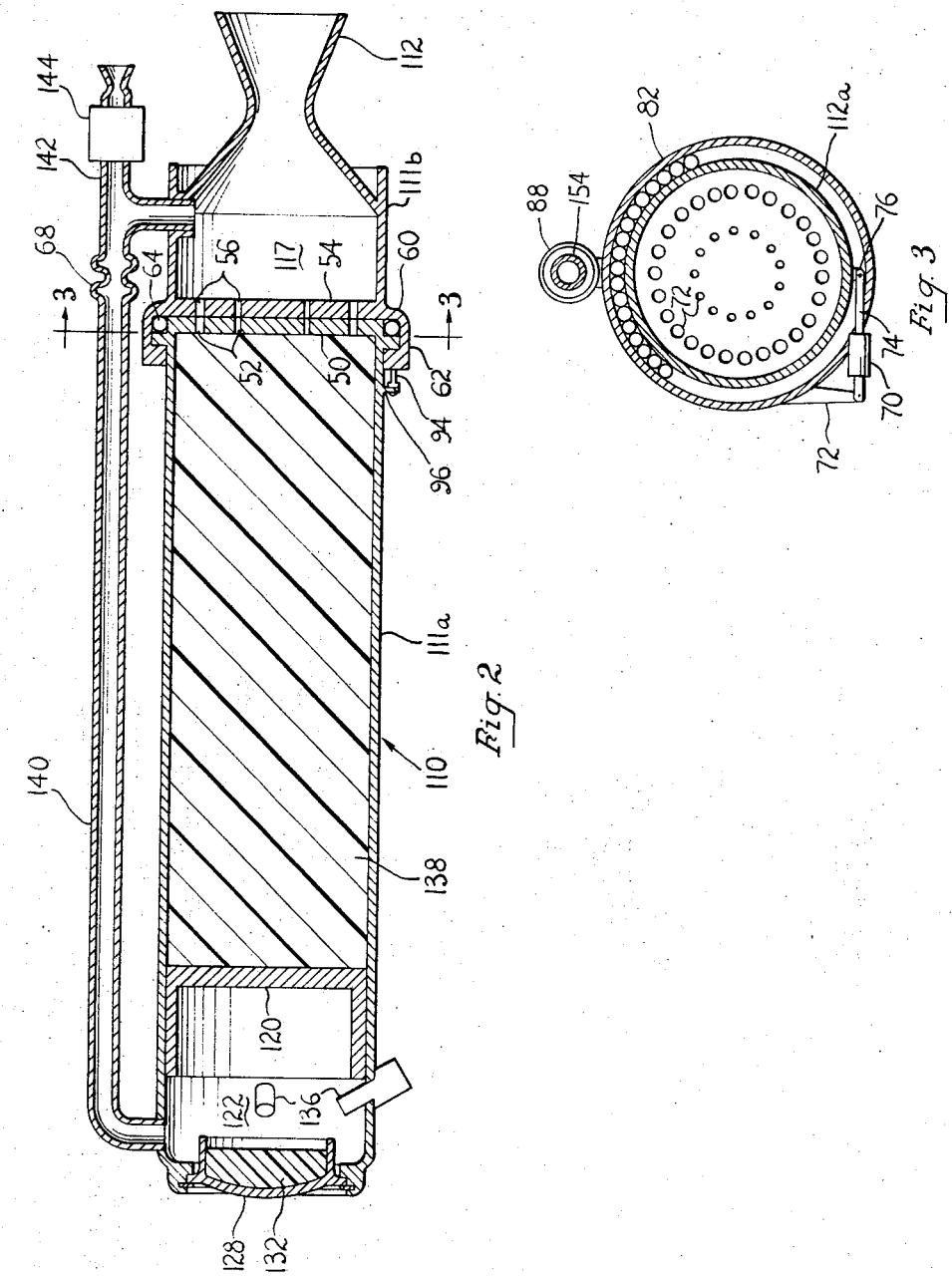

3,349,563
THRUST CONTROL APPARATUS FOR PLASTIC PROPELLANT ROCKET MOTOR
Elliot L. Taylor, Whippany, N.J., and Harry W. Burdett, Bethesda, Md., assignors to Thiokol Chemical Corporation, Bristol, Pa., a corporation of Delaware
Filed Nov. 15, 1965, Ser. No. 507,760
4 Claims. (Cl. 60—252)

ABSTRACT OF THE DISCLOSURE

Apparatus for controlling the thrust of a rocket motor which utilizes plastic propellant, comprising a piston slidably disposed within a rocket motor casing, a combustible charge disposed between said piston and the head end of said casing, and conduit and valve means arranged so that a portion of the gas generated by combustion of said charge can be selectively vented either to the combustion chamber of said rocket motor or to the space outside the latter, thereby controlling the pressure differential across said piston.

---

This invention relates to a rocket motor and, more particularly, to a variable thrust rocket motor the propellant of which is a plastic material.

The difficulty in varying and terminating the thrust of solid propellant rocket motors has limited their use in spite of their advantages in simplicity, high propellant mass fraction, and high density impulse. However, in accordance with the principles of this invention, there is provided a rocket motor which possesses the advantages of a solid propellant rocket motor and which also includes effective means for varying or terminating the thrust thereof. More particularly, the rocket motor disclosed herein includes gas-generating means for forcing a plastic, combustible propellant, such as compositions of the type described in columns 13, 14, 15 and 16 of U.S. Patent 3,092,959, issued to A. C. Scurlock et al. on June 11, 1963, into the combustion chamber thereof. In addition, the disclosed rocket motor is provided with means for selectively injecting a portion of the gas produced by said gas-generating means into the combustion chamber of the rocket motor, which, as will be explained in detail hereinafter, permits the thrust of the rocket motor to be varied according to any desired program.

Accordingly, it is an object of this invention to provide a rocket motor which utilizes a semisolid propellant and is capable of producing a variable thrust.

Another object of this invention is to provide an uncomplicated, lightweight rocket motor which utilizes a semisolid propellant and which can be periodically started and stopped to provide a desired thrust program.

Other objects and advantages of the present invention will become apparent in the following description of two embodiments thereof, in which reference is made to the accompanying drawings, wherein:

FIGURE 1 is a diagrammatic, longitudinal sectional view of a rocket motor constituting a preferred embodiment of the invention;

FIGURE 2 is a diagrammatic, longitudinal sectional view of a rocket motor constituting another embodiment of the invention; and FIGURE 3 is a diagrammatic, cross-sectional view of the rocket motor illustrated in FIGURE 2, taken in the indicated direction along the plane represented by line 3—3 in that drawing.

Throughout the specification and drawings, like reference numbers refer to like parts.

In FIGURE 1 reference number 10 generally designates a rocket motor which comprises a tubular casing 11 having a thrust nozzle 12 mounted on the aft end thereof. Fixedly disposed within casing 11 adjacent the aft end thereof is a dished plate 13 which is generally transverse to said casing and which has a plurality of apertures 14 formed therein. More particularly, plate 13 is mounted on the forward end of a tubular member 15 which is concentrically disposed within casing 11 and the aft end of which is joined to said casing by means of an annular, radially extending member 16. Plate 13 and the wall 15 aft thereof define the combustion chamber 17 of rocket motor 10. Prior to operation of rocket motor 10, a burst diaphragm 18 is positioned within the enlarged forward portion of each aperture 14 and a piston 20 is disposed within casing 11 adjacent the forward end thereof, this piston and the wall of said casing forward thereof defining a forward chamber 22 of rocket motor 10. For the purpose of interpretation of claims appended hereto, members 15 and 16 are to be considered part of the casing of rocket motor 10. The peripheral surface of piston 20 is slidably engaged with the inner surface of casing 11 so that the piston can be moved longitudinally of said casing toward plate 13. At its forward end casing 11 is provided with an aperture 24 the longitudinal axis of which is coincident with the longitudinal axis of said casing. The wall of aperture 24 includes a shoulder that is perpendicular to the common longitudinal axis of said aperture and casing 12, and abutting this shoulder is a flange 26 that extends laterally from a cup-shaped charge holder 28. This charge holder is fixedly held within aperture 24 by means of a ring 30 the peripheral edge of which is engaged within a circumferentially-extending groove formed in the wall of said aperture. A combustible charge 32 is fixedly held in charge holder 28, the aft end surface of said charge being exposed to chamber 22 and spaced slightly forward of the outlet ducts 34 of a plurality of igniters 36. The outlet ducts 34 of igniters 36 respectively extend through apertures formed in casing 11 and are fixedly secured therein. Igniters 36 are spaced circumferentially of casing 11 and obliquely disposed with respect to the longitudinal axis thereof so that the flame discharged from each of said igniters when it is actuated is directed toward the aft end surface of charge 32. Each igniter is connected to actuating means (not shown) which permit it to be separately fired, and is insulated so that it will not be ignited by the high-temperature gases which are evolved by combustion of charge 32. Disposed within casing 11 between plate 13 and piston 20 is a propellant 38 which will be further described hereinafter.

A conduit 40 is fixedly mounted on casing 11, the ends of said conduit being respectively fixedly positioned in an aperture adjacent the forward end of said casing and in an aperture adjacent the aft end thereof so that the passage in said conduit communicatively connects the forward chamber 22 of rocket motor 10 with its combustion chamber 17. At the aft portion of conduit 40 is a vent pipe 42. A flow control valve 44 is connected to conduit 40 and to actuating means (not shown) adapted to selectively vary the rate of gas flow through vent pipe 42 to the space surrounding rocket motor 10.

Structural components of the above-described rocket may be formed of any suitable metals. Charge 32 comprises a solid propellant of the well-known type in which oxidizer and fuel are interspersed in a combustible matrix. Propellant 38 is preferably a solid propellant material which is uncured and thus plastic and capable of being extruded through the apertures 14 in plate 13 into combustion chamber 17. However, comminuted particles of solid propellant can also in some instances be utilized as the propellant 38 for rocket motor 10.

To operate rocket motor 10, one of the igniters 36 is fired, whereupon the flame discharge therefrom ignites charge 32. The gaseous products of combustion of charge 32 pressurize the forward chamber 22 of rocket motor 10 and also pressurize conduit 40 which communicates with said forward chamber. Consequently the combustion products of charge 32 also enter the combustion chamber 17 of rocket motor 10. Piston 20 is moved toward plate 13 by the pressure within forward chamber 22, rupturing the diaphragms 18 in aperture 14 in plate 13 and forcing the plastic propellant 38 through said apertures into combustion chamber 17. Since the combustion products of charge 32 which flow into combustion chamber 17 are at an elevated temperature, the propellant 38 extruded into said chamber is ignited. Means, such as a disk (not shown) pivotally mounted on the wall of combustion chamber 17, can be provided to block the orifice of thrust nozzle 12 to aid build-up of pressure and temperature in combustion chamber 17, this means being pivoted away from the orifice of said thrust nozzle after the propellant 38 extruded into said combustion chamber has been ignited. The resulting thrust produced by combustion of propellant 38 can be varied by means of valve 44, which can be operated to control the flow of the combustion products of charge 32 into combustion chamber 17 by selectively venting different amounts of said combustion products through vent pipe 42 to the exterior of the rocket motor. Thus, for example, when it is desired to reduce the thrust of rocket motor 10, valve 44 is partially opened to permit a portion of the gas flowing through conduit 40 to pass through vent pipe 42 to the surrounding atmosphere or space, which lowers the pressure in the forward chamber 22 of rocket motor 10. This decrease in pressure in forward chamber 22 reduces the rate of combustion of charge 32, which lowers the pressure in said forward chamber still further. Therefore the velocity of piston 20 in the direction of plate 13 is reduced, as is the rate of extrusion of propellant 38 into combustion chamber 17 and its combustion therein, with the result that the thrust of rocket motor 10 is lowered. If it is desired to increase thrust, valve 44 can, of course, be closed to restore the prior operating conditions within the rocket motor. With suitable design of conduit 40, vent pipe 42, and valve 44, and with proper control of said valve, it is possible to lower the pressure in forward chamber 22 to a point where charge 32 stops burning and the thrust of rocket motor 10 is terminated. However, to restart the rocket motor, valve 44 can be closed and another of the igniters 36 fired to again ignite charge 32 and pressurize forward chamber 22.

Most of the components of the second embodiment of the invention illustrated in FIGURES 2 and 3 respectively correspond in function to components of the rocket motor illustrated in FIGURE 1 and described immediately hereinabove. Therefore in FIGURES 2 and 3 components of the second embodiment that correspond to components of the rocket motor of FIGURE 1 are designated by the same reference number used in that drawing plus 100. However, the rocket motor 110 illustrated in FIGURES 2 and 3 differs from that illustrated in FIGURE 1 in having a tubular casing which comprises coaxial forward and aft sections, respectively designated by the reference numbers 111a, 111b, which are rotatable relative to each other. More particularly, the forward section 111a of said casing has a first integral, transverse plate 50 at the aft end thereof, this plate having a plurality of apertures 52 formed therein and arranged in two concentric rows, and the aft section 111b of said casing is provided with a second integral, transverse plate 54 which abuts said first plate and which also has a plurality of apertures 56 formed therein and arranged in two concentric rows. As illustrated in FIGURE 2, apertures 52 respectively register with apertures 56 when plates 50 and 54 are in a first aligned position relative to each other. Spaced a short distance forward of the aft end of the forward section 111a of the rocket motor casing is an integral, circumferentially extending flange 58. At its forward end the aft section 111b of the rocket motor casing is provided with an integral, circumferentially extending flange 60 having a forwardly extending cylindrical member 62 joined to the periphery thereof. A plurality of bearings 64 are disposed in the annular space defined by the aft surface of flange 58, the forward surface of flange 60, the inner surface of member 62 and the outer surface of the forward section 111a of the rocket motor casing. The two sections 111a, 111b of the rocket motor casing are rotatably locked together by means of a ring 66 the periphery of which is threadedly engaged with member 62 and the inner surface of which slidably abuts the forward surface of flange 58 and the outer surface of the forward section 111a of said rocket motor casing. The conduit 140 which communicatively connects the forward chamber 122 with the combustion chamber 117 of the rocket motor includes a flexible portion 68 that permits the forward and aft sections 111a, 111b of the rocket motor casing to rotate relative to each other without deformation of the rigid portions of said conduit. This rotation of the sections 111a, 111b can be effected by actuation of a hydraulic or pneumatic cylinder 70 (see FIG. 3) the casing of which is pivotally connected to a support lug 72 integrally joined to member 62 of the aft section 111b and the drive shaft 74 of which is pivotally connected to a support lug 76 that is fixedly attached to the forward section 111a at a point forward of member 62.

From the description of the manner of operation of the rocket motor illustrated in FIGURE 1, it should be readily understood that one of the plurality of igniters 136 of the above-described second embodiment of the invention can be fired to ignite the charge 132 thereof, after which the combustion products of said charge exert pressure against the piston 120 and also flow through conduit 140 to the combustion chamber 117 of the rocket motor. As explained hereinbefore, in the operation of the rocket motor illustrated in FIGURE 1 the valve 44 thereof can be actuated to control the pressure differential between the forward chamber 22 and the combustion chamber 17 of said rocket motor and thus the rate of extrusion of propellant 38 into said combustion chamber. Likewise, in the operation of the rocket motor illustrated in FIGURES 2 and 3 the valve 144 thereof can be actuated to control the pressure differential between the forward chamber 122 and the combustion chamber 117 of said rocket motor and thus, when the apertures 52, 56 in the plates 50, 54 are in register, the rate of extrusion of propellant 138 into said combustion chamber. However, in the operation of the second embodiment of the invention it is also possible to control the rate of extrusion of propellant 138 into combustion chamber 117 by means of cylinder 70, which can be actuated to extend or retract drive shaft 74 to thereby rotate the aft section 111b of the rocket motor casing between a first angular position relative to the forward section 111a thereof wherein the apertures 56 in plate 54 respectively register with the apertures 52 in plate 50 and a second angular position relative to said forward section wherein said apertures 56 are out of register with said apertures 52 (out of register being defined as a position of said apertures 52, 56 relative to one another other than the aligned position illustrated in FIGURE 2, which includes a completely blocked relation of the apertures as well as partially open relations thereof). Hence the rate of propellant flow into the combustion chamber 117 can be effectively controlled by actuating valve 144 to vent combustion products of charge 132 outside the rocket motor casing, or by actuating cylinder 70 to vary the angular relation of plates 50, 54 or by a combination of these means.

It will be recognized by inspection of the construction and arrangement of the two embodiments of the invention illustrated in FIGURE 1 and FIGURES 2 and 3 respectively that this invention provide an uncomplicated and effective means for selectively controlling the thrust of a rocket motor that uses a semisolid propellant. Moreover, in accordance with principles of this invention, the thrust of a rocket motor utilizing a plastic propellant can be conveniently terminated at a selected time during its operation, and thereafter the rocket motor can be fired again as desired.

It should also be recognized that various changes can be made in the rocket motors which have been described and illustrated herein by way of example. For example, in some applications of the principles of the invention, it will be advantageous to provide a rocket motor with two or more conduit, vent pipe and valve assemblies having the same construction, arrangement and function as the conduits 40, 140 and their respective vent pipes 42, 142 and valves 44, 144. Also in some applications of the invention, it will be advantageous to provide one or more igniters in the combustion chamber 17, 117 for igniting the propellant material extruded therein. Therefore, it is to be understood that the scope of the invention is limited only by the terms of the appended claims.

What is claimed is:

1. A rocket motor comprising a tubular casing with at least one thrust nozzle mounted on the aft end thereof, a transverse plate fixedly disposed within said casing adjacent the aft end thereof and having a plurality of apertures formed therein, the portion of said casing aft of said plate defining a combustion chamber, a piston disposed within said casing, the peripheral surface of said piston being slidably engaged with the inner surface of said casing, the portion of said casing forward of said piston defining a forward chamber, a combustible charge disposed within said forward chamber, a plastic propellant disposed within said casing between said plate and said piston, at least one conduit mounted on said casing and communicatively connecting said forward chamber and said combustion chamber, means for igniting said charge whereupon the combustion products thereof pressurize said forward chamber and said conduit, said piston is urged toward said plate, and said propellant is forced through said apertures into said combustion chamber, and valve means connected to said conduit and adapted to selectively vary the flow of said combustion products of said charge into said combustion chamber.

2. A rocket motor as defined in claim 1 wherein said valve means comprises a vent pipe connected to said conduit and a valve connected to said vent pipe and adapted to selectively vent said combustion products of said charge outside said casing.

3. A rocket motor comprising a tubular casing having coaxial forward and aft sections, a first transverse plate fixedly connected to the aft end of said forward section and having a plurality of apertures formed therein, a second transverse plate fixedly connected to the forward end of said aft section and having a plurality of apertures formed therein, said aft section being rotatable between first and second angular positions thereof relative to said forward section wherein said apertures in said second plate are respectively in and out of register with said apertures in said first plate, said aft section defining the combustion chamber of said rocket motor, a piston disposed within said forward section, the peripheral surface of said piston being slidably engaged with the inner surface of said forward section, the portion of said forward section forward of said piston defining a forward chamber, a combustible charge disposed within said forward chamber, a plastic propellant disposed within said forward section between said first plate and said piston, at least one conduit mounted on said casing and communicatively connecting said forward chamber and said combustion chamber, means for igniting said charge whereupon the combustion products thereof pressurize said forward chamber and said conduit and whereupon said piston is urged toward said first plate, valve means connected to said conduit and adapted to selectively vary the flow of said combustion products of said charge into said combustion chamber, and means for rotating said aft section between said first and second angular positions thereof relative to said forward section to thereby bring said apertures in said second plate respectively into and out of register with said apertures in said first plate.

4. A rocket motor as defined in claim 3 wherein said valve means comprises a vent pipe connected to said conduit and a valve connected to said vent pipe and adapted to selectively vent said combustion products of said charge outside said casing.

References Cited

UNITED STATES PATENTS

| 2,671,312 | 3/1954 | Roy | 60—259 X |
| 2,971,097 | 2/1961 | Corbett | 60—252 X |
| 3,067,574 | 12/1962 | Corbett | 60—252 X |
| 3,092,959 | 6/1963 | Scurlock et al. | 62—252 X |
| 3,173,252 | 3/1965 | Ziegenhagen | 60—252 X |

FOREIGN PATENTS

| 784,121 | 10/1957 | Great Britain. |

CARLTON R. CROYLE, *Primary Examiner.*